United States Patent
Arujunan et al.

(10) Patent No.: US 8,675,112 B2
(45) Date of Patent: *Mar. 18, 2014

(54) IMAGING DEVICE PROVIDING CAPTURE LOCATION GUIDANCE

(75) Inventors: Thiagarajah Arujunan, Penfield, NY (US); Timothy L. Nichols, Spencerport, NY (US); Kenneth Alan Parulski, Rochester, NY (US); Thomas Joseph Murray, Cohocton, NY (US); Brian Joseph O'Keefe, Rochester, NY (US)

(73) Assignee: Intellectual Ventures Fund 83 LLC, Las Vegas, NV (US)

( * ) Notice: Subject to any disclaimer, the term of this patent is extended or adjusted under 35 U.S.C. 154(b) by 26 days.

This patent is subject to a terminal disclaimer.

(21) Appl. No.: 13/168,043

(22) Filed: Jun. 24, 2011

(65) Prior Publication Data

US 2012/0327265 A1 Dec. 27, 2012

(51) Int. Cl.
*H04N 5/222* (2006.01)

(52) U.S. Cl.
USPC ............. 348/333.02; 348/333.04; 348/333.01

(58) Field of Classification Search
USPC ............. 348/333.01, 333.02, 333.04, 333.05, 348/333.11
See application file for complete search history.

(56) References Cited

U.S. PATENT DOCUMENTS

| | | | |
|---|---|---|---|
| 5,164,831 A | 11/1992 | Kuchta et al. | |
| 5,760,917 A | 6/1998 | Sheridan | |
| 6,389,181 B2 | 5/2002 | Shaffer et al. | |
| 6,915,273 B1 | 7/2005 | Parulski et al. | |
| 7,995,117 B1 * | 8/2011 | Bonn | 348/231.3 |
| 8,136,167 B1 * | 3/2012 | Gossweiler et al. | 726/27 |
| 2003/0063194 A1 * | 4/2003 | Nishiyama et al. | 348/207.1 |
| 2006/0028555 A1 | 2/2006 | Fredlund | |
| 2006/0142942 A1 * | 6/2006 | Pyo | 701/211 |
| 2008/0174676 A1 | 7/2008 | Squilla et al. | |
| 2008/0294487 A1 * | 11/2008 | Nasser | 705/8 |
| 2009/0040324 A1 * | 2/2009 | Nonaka | 348/220.1 |
| 2009/0102940 A1 * | 4/2009 | Uchida | 348/222.1 |
| 2011/0050909 A1 * | 3/2011 | Ellenby et al. | 348/207.1 |

OTHER PUBLICATIONS

Comparative Testing of Face Detection Algorithms, Nikolay degtyarev & Oleg Seredin, Tula State University http://lda.tsu,tula.ru/papers/degtyarev-2010-icisp-ctfd.pdf.

Team Building Scavenger Hunt, The Go Game, http:/www.thegogame.com/team/offerings/team_building_go-game.asp.

(Continued)

Primary Examiner — Lin Ye
Assistant Examiner — Euel Cowan

(57) ABSTRACT

An image capture device, comprising an image sensor, an image display, a data processing system; a storage memory and a program memory storing instructions configured to cause the data processing system to provide guidance for capturing images at a plurality of locations, by displaying guidance information for capturing a first digital image at a first location, using the image sensor to capture a first digital image, storing the first digital image in the storage memory, using the data processing system to analyze the pixel data of the first digital image and determining based on such analysis a second possible image capture location, wherein the second possible image capture location is selected from a plurality of different possible locations, displaying guidance information for a capturing a second scene at the second location, using the image sensor to capture a second digital image; and storing the second digital image in the storage memory.

20 Claims, 12 Drawing Sheets

(56) References Cited

OTHER PUBLICATIONS

Toward Context and Preference-Aware Location-based Services, Mohamed F. Mokbel, Justin J. Levandoski, Copyright 2009, ACM978-1-60558-712—Jul. 9, 2006.

Image Recognition as a Method for Opt-in and Applications for Mobile Marketing, G.G. Ramkumar, Mar. 2008, Copyright 2008 SnapTell, Inc.

Dylan's Candy Bar uses mobile scavenger hunt to bolster CRM, Mobile commerce Daily, http://www.mobilecommercedaily.com.

* cited by examiner

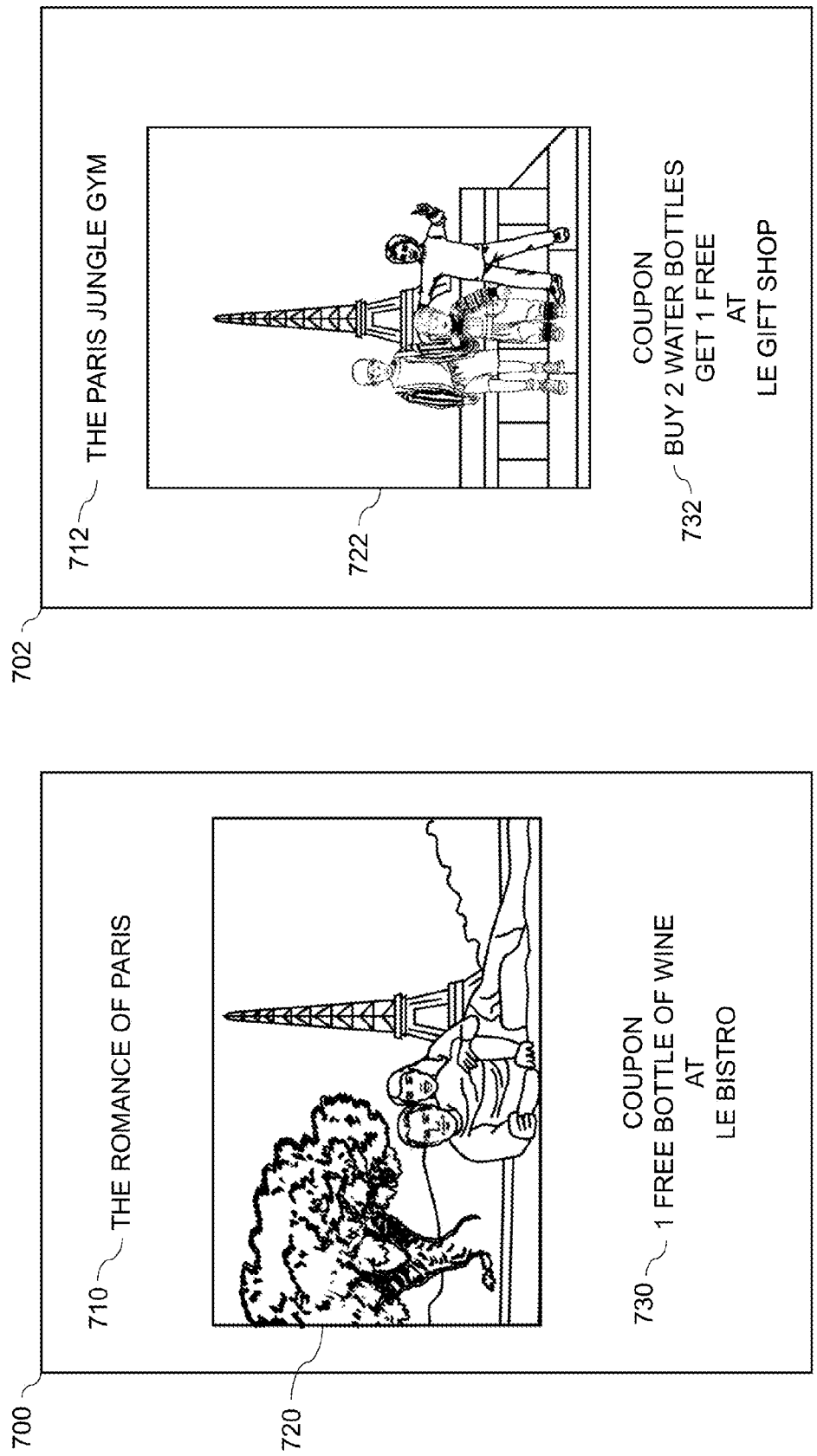

IMAGING DEVICE PROVIDING CAPTURE LOCATION GUIDANCE

CROSS REFERENCE TO RELATED APPLICATIONS

Reference is made to commonly-assigned, co-pending U.S. patent application Ser. No. 13/168,003, filed Jun. 24, 2011, entitled "Guidance for Image Capture at different Locations", by Timothy L. Nichols, et al. and U.S. patent application Ser. No. 13/168,027, filed Jun. 24, 2011, entitled "Photo Product Using Images from Different Locations" by Timothy L. Nichols, et al. the disclosures of which are incorporated herein.

Reference is made to commonly assigned, co-pending U.S. patent application Ser. No. 12/693,621 by Dhiraj Joshi, et al. filed on Jan. 26, 2010, entitled "On-location recommendation for photo composition", U.S. patent application Ser. No. 12/692,815 by Jiebo Lou filed on Jan. 25, 2010, entitled "Recommending places to visit", U.S. patent application Ser. No. 12/914,310 by Tomi Lahcanski et al. filed on Oct. 28, 2010, entitled "Method of locating nearby picture hotspots", U.S. patent application Ser. No. 12/914,266 by Tomi Lahcanski et al. filed on Oct. 28, 2010 and entitled "Method of locating nearby picture hotspots and U.S. patent application Ser. No. 12/914,294 by Tomi Lahcanski et al. filed on Oct. 28, 2010, entitled "Organizing nearby picture hotspots".

FIELD OF THE INVENTION

The present invention relates to image capture devices, and more particularly relates to image capture devices which provide guidance for capturing images at different locations.

BACKGROUND OF THE INVENTION

Mobile phones, tablet computers, networked cameras, and other portable devices incorporating camera modules and network connections to the Internet have opened up opportunities for new and exciting gaming, entertainment, and structured learning experiences. This technology is currently used to create geocache treasure hunt games and photo-based scavenger hunt games. It is also used to enable museum tours as well as tours of historic areas and other tourist attractions.

However, these experiences are relatively static. Typically, the game or experience is designed once and played many times in a similar manner by all the users. In some cases, these games or experiences are provided, or modified, based on the location of the user. For instance, the Geocache Navigator, from Trimble Navigation Limited, Sunnyvale, Calif. is an application (APP) for a Smartphone which uses the phone's GPS and interne connections to access live information directly from geocaching.com. This enables a user to locate geocache challenges which are closest to their current location.

It is known to provide preference-aware location-based services, as described in the paper titled "Toward context and preference-aware location-based services" authored by Mokbel et al. Such systems tailor their services based on the preference and context of each customer. For example, in a restaurant finder application, the system can use the dietary restrictions, price range, other user ratings, current traffic, and current waiting time to recommend nearby restaurants to the customer, rather than recommending all of the closest restaurants.

Photography is often used to record and share experiences, such as vacation trips, family outings, or seasonal events. Still and video images of such experiences can be captured using image capture devices such as camera phones, digital cameras, and camcorders. The digital images captured by these image capture devices can be shared by e-mail and uploaded to web sites such as Facebook and Flickr, where they can be viewed by friends. The uploaded images can be printed using photo service providers, such as the Kodak Gallery at www.kodakgallery.com. Users can order photo products, such as photo books and collages, which utilize uploaded digital images.

It is known to produce enhanced photo products by combining images captured with an image capture device and professionally produced digital content, as described in commonly-assigned U.S. patent application Ser. No. 11/626,471 (published as 20080174676), "Producing enhanced photographic products from images captured at known events" to Squilla, et al, incorporated herein by reference. The system includes a database for storing custom content for a plurality of events. The system also includes a digital image capture device that stores a digital image and information defining the date/time and geographic location of the digital image. A service provider automatically determines if the timestamp and the geographic information corresponds to events stored in the custom content database. A processor produces an enhanced photographic product including the captured digital image and custom content corresponding to the timestamp and location of the captured digital image.

It is known to use image recognition techniques to produce a photocollage from a plurality of images, as described in commonly-assigned U.S. Pat. No. 6,389,181 "Photocollage generation and modification using image recognition" to Shaffer et al, incorporated herein by reference. The system sorts digital records associated with a plurality of images, by culling or grouping to categorize the records according to an event, person, or chronology, in order to automatically compose a photocollage.

What is needed is an image capture device, such as a smart phone, which provides guidance for capturing images at different locations. The image capture device should preferably provide a dynamic, compelling, photo-based experience responsive to the user, situation, and conditions.

SUMMARY OF THE INVENTION

In accordance with the invention, there is provided an image capture device, comprising:
  a) an image sensor for capturing a digital image of a scene;
  b) an image display;
  c) a data processing system;
  d) a storage memory for storing captured images; and
  e) a program memory communicatively connected to the data processing system and storing instructions configured to cause the data processing system to control elements a)-e) to provide guidance for capturing images at a plurality of locations, by:
    i) displaying, on the image display, guidance information for capturing a first digital image at a first location;
    ii) using the image sensor to capture a first digital image;
    iii) storing the first digital image in the storage memory
    iv) using the data processing system to analyze the pixel data of the first digital image and determining based on such analysis a second possible image capture location, wherein the second possible image capture location is selected from a plurality of different possible locations;
    v) displaying, on the image display, guidance information for capturing a second scene at the second location;

vi) using the image sensor to capture a second digital image; and vii) storing the second digital image in the storage memory.

It is an advantage of the present invention to provide an image capture device which provides an appropriate experience for capturing images at different locations.

It is a further advantage of the present invention to provide an image capture device which provides guidance to a user in order to adapt the experience for different users, situations, or conditions.

It is a feature of the invention that the guidance is provided after analyzing the pixel data of a captured digital image, in order to determine a second possible image capture location based on the user, situation, or condition.

BRIEF DESCRIPTION OF THE DRAWINGS

FIG. 8A and FIG. 8B depict two different example photo products created with images received from users which were captured at the same location and utilize different prestored information.

Figure 1:
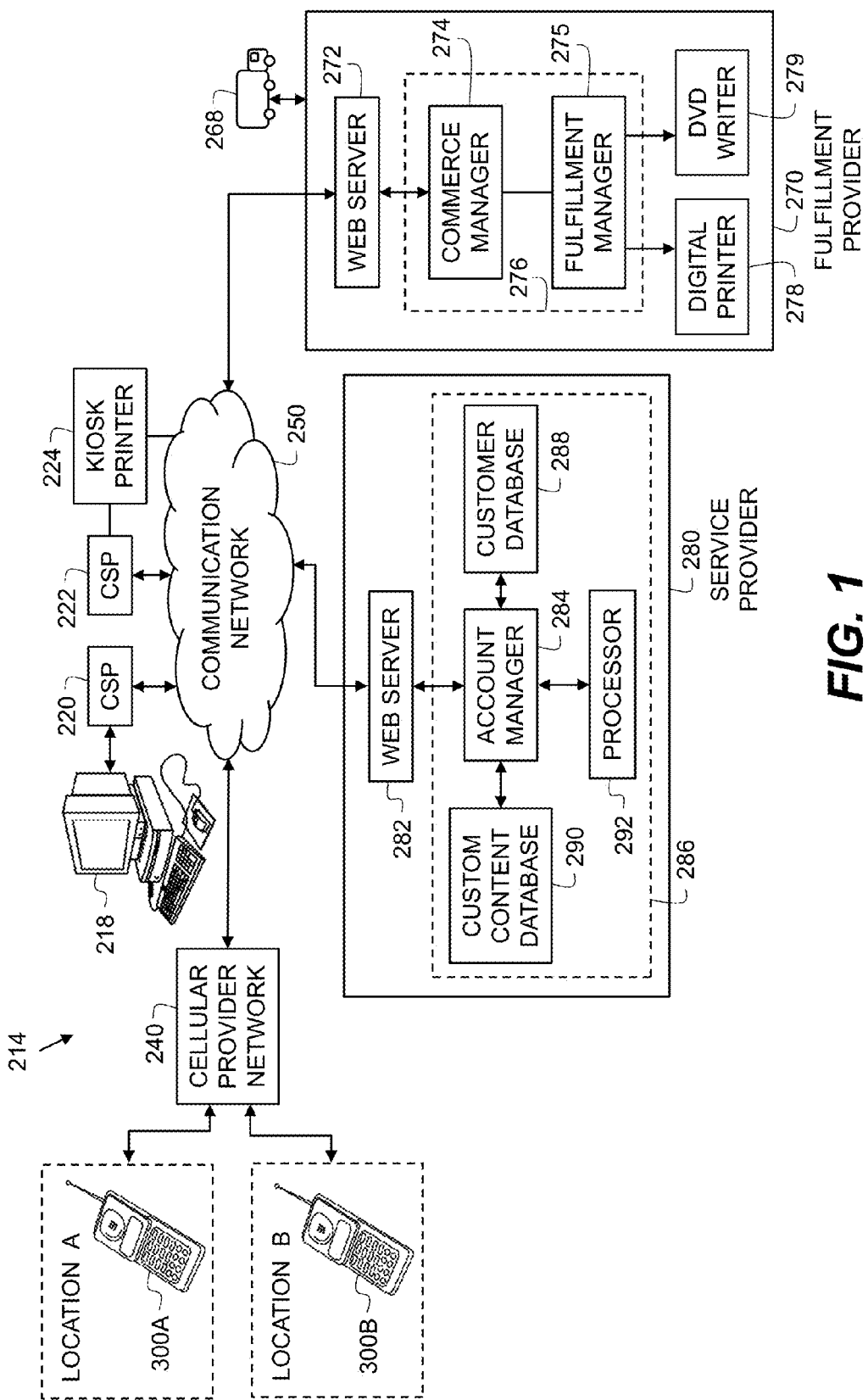
FIG. 1 is a block diagram of a digital imaging system in accordance with an embodiment of the present invention.

It is to be understood that the attached drawings are for purposes of illustrating the concepts of the invention and may not be to scale.

DETAILED DESCRIPTION OF THE INVENTION

In the following description, some embodiments of the present invention will be described in terms that would ordinarily be implemented as a software program. Those skilled in the art will readily recognize that the equivalent of such software can also be constructed in hardware. Because image manipulation algorithms and systems are well known, the present description will be directed in particular to algorithms and systems forming part of, or cooperating more directly with, the system and method in accordance with the present invention. Other aspects of such algorithms and systems, and hardware or software for producing and otherwise processing the image signals involved therewith, not specifically shown or described herein, can be selected from such systems, algorithms, components and elements known in the art. Given the system as described according to the invention in the following materials, software not specifically shown, suggested or described herein that is useful for implementation of the invention is conventional and within the ordinary skill in such arts.

Still further, as used herein, a computer program for performing the method of the present invention can be stored in a non-transitory computer readable storage medium, which can include, for example; magnetic storage media such as a magnetic disk (e.g., a hard drive or a floppy disk) or magnetic tape; optical storage media such as an optical disc, optical tape, or machine readable bar code; solid state electronic storage devices such as random access memory (RAM), or read only memory (ROM); or any other physical device or medium employed to store a computer program having instructions for controlling one or more computers to practice the method according to the present invention.

The invention is inclusive of combinations of the embodiments described herein. References to "a particular embodiment" and the like refer to features that are present in at least one embodiment of the invention. Separate references to "an embodiment" or "particular embodiments" or the like do not necessarily refer to the same embodiment or embodiments; however, such embodiments are not mutually exclusive, unless so indicated or as are readily apparent to one of skill in the art. The use of singular or plural in referring to the "method" or "methods" and the like is not limiting. It should be noted that, unless otherwise explicitly noted or required by context, the word "or" is used in this disclosure in a non-exclusive sense.

Because wireless image capture devices and systems, such as camera phones connected via cellular telephone systems to service providers using the Internet are well known, the present description will be directed in particular to elements forming part of, or cooperating more directly with, the method and apparatus in accordance with the present invention. Elements not specifically shown or described herein are selected from those known in the art. Certain aspects of the embodiments to be described are provided in software. Given the system as shown and described according to the invention in the following materials, software not specifically shown, described or suggested herein that is useful for implementation of the invention is conventional and within the ordinary skill in such arts.

The following description of image capture devices and imaging systems will be familiar to one skilled in the art. It will be obvious that there are many variations of this embodiment that are possible and are selected to reduce the cost, add features, or improve the performance of these devices and systems. The present invention is illustrated by way of example and not a limitation in the accompanying figures.

Referring to FIG. 1, there is illustrated a system 214 for capturing digital images along with location and time information, and using the images and information to provide customized photo products. As used herein the term digital image includes both digital still images and digital video images. A first camera phone 300A, located at a first location A, and a second camera phone 300B, located at a second location B, can communicate using a cellular provider network 240. The cellular provider network 240 provides both voice and data communications using transmission devices located at cell towers throughout a region. The cellular provider network 240 is coupled to a communication network 250, such as the Internet. It will be understood that system 214 typically includes many other camera phones, in addition to camera phone 300A and camera phone 300B. It will be understood that the system 214 can include multiple cellular provider networks 240, for example networks provided by companies such as Verizon, AT&T, and Sprint, which can be coupled to the communication network 250.

The communications network 250 enables communication with a service provider 280. Service provider 280 includes a web server 282 for interfacing with communications network 250. In addition to interfacing to communications network 250, web server 282 transfers information to a computer system 286 which manages images and information associated with various customers and with image content associated with different locations and events. It will be understood that the system 214 can include a plurality of service providers 280, which provide different services and can support different regions of the world.

The computer system 286 includes an account manager 284, which runs software to permit the creation and management of individual customer photo imaging accounts and to also permit the creation and management of collections of custom content images, such as professional images, and other content associated with various events and locations. The customer images and associated information are stored in a customer database 288. The customer account information can include personal information such as name and address, billing information such as credit card information, and authorization information that controls access to the customer's images by third parties. The professional images and other custom content associated with the supported events and locations are stored in custom content database 290.

Thus, the customer database 288 stores customer image files and related metadata, such as location and time information which identifies the location at which the image was captured, and the time of capture. The custom content database 290 stores custom content, such as professionally captured images and other information, such as captions, titles, text, graphics, templates, and related metadata. For example, the custom content database 290 can store images and other information related to particular vacation destinations (e.g. Washington D.C., New York City, Cape May N.J.) and particular events (Rose Bowl Parade, Professional Sports events, Major Concerts.). The custom content database 290 includes an index providing location or event data such as the GPS coordinate boundaries of locations, object identifying feature points, object identifying color profiles, or the time boundaries of events, so that locations (such as Cape May, or Yellowstone National Park) and events (such as the Rose Bowl Parade or the Rochester Lilac Festival) can be identified.

The custom content database 290 also stores guidance information, which is used to provide guidance to a user concerning what images should be captured by a user in a general location. In some embodiments, the guidance information provides locations which are likely to be considered to be good "photo spots" by the particular user of one of the camera phones 300A, 300B. In some embodiments, the guidance information includes at least one image related to the suggested location. For example, the guidance can include a photo of a particular object, along with a text message that provides a general direction, or other clues, for locating the object. In some embodiments, the guidance can also include text or graphics which instruct the user to capture an image of their group near the object, and to email the image to the service provider.

In some embodiments, guidance for capturing images at different locations is provided in a manner so as to dynamically alter the photo-based experience responsive to input received during the experience. In this way, the experience adapts to a particular user's situation and conditions. For example, a photo submitted at one point in the experience can indicate that the user is accompanied by children. This can result in future experience objectives being more suitable to a younger audience. In another example, input received from the user can indicate that it is raining or snowing. In this condition, future experience objectives can be tailored to indoor venues.

The computer system 286 includes a processor 292, which is used to analyze the pixel data of some of the customer images which are uploaded and stored in the customer database 288. For example, in some embodiments the processor 292 can analyze the pixel data in order to detect faces in one or more customer images using a variety of known face detection algorithms. Such algorithms are described, for example, in a paper titled "Comparative Testing of Face Detection Algorithms" by Degtyarev et al., which is available from http://lda.tsu.tula.ru/papers/degtyarev-2010-icisp-ctfd.pdf and is incorporated herein by reference. In some embodiments, the face detection algorithm determines the number of faces that can be detected in an image, in order to determine how many people are depicted in the image. In some embodiments, the face detection algorithm determines the approximate ages of the people whose faces have been detected. It will be understood that the term approximate age, as used herein, relates to categorizing one or more faces into broad, age-related categories. These approximate age categories can include, for example, babies, young children, teens, younger adults, and older adults (i.e. senior citizens).

In some embodiments, the processor 292 in the computer system 286 can analyze the pixel data of some of the customer images in order to determine whether one or more landmarks are depicted in the images. Such image recognition algorithms are used, for example, in the Google Goggles Application (APP) for the Android mobile platform, which is available from Google, Mountain View, Calif.

In some embodiments, the processor 292 in the computer system 286 creates the information needed to provide a unique photo product for a particular user of one of the mobile phones 300A, 300B by incorporating images captured during the user's photo-based experience with prestored information, such as professional images and textual descriptions. This enables a photo product to be automatically created by placing the captured images in predetermined locations in the photo product, so that they are associated with the prestored information. For example, a first image captured near the Lincoln Memorial in Washington D.C. can be associated with prestored information which describes the presidency of Abraham Lincoln and provides professional photographs of the Lincoln Memorial or an image related to his Gettysburg Address speech. A second image, captured near the White House, can be associated with prestored information that describes or depicts the current president or the construction of the White House.

In some embodiments, the processor 292 in the computer system 286 modifies the appearance of one or more of the captured digital images, so that it has a more suitable appearance when incorporated into the photo product. In some embodiments, faces in the captured digital image can be detected, and the processor 292 can crop the digital image to enlarge the size of the faces and remove some of the distracting background surrounding the face.

In some embodiments, captured digital images can be processed by the processor 292 to provide a different image appearance. For example, captured digital images can be processed so that the newly captured images appear to be older photographs, such as daguerreotypes, so that they have a more suitable appearance when positioned in a photo product in association with an image related to the Gettysburg Address. As another example, the captured digital images can be processed to provide an image having a different color tint, contrast, or external shape, so that it has a more suitable appearance when positioned in a photo product as part of an advertisement for a product or service. As another example, the captured digital images can be processed to provide a cartoon effect or a coloring book effect so that they have a more suitable appearance when positioned in a children's photo product in association with prestored cartoons or as part of a page which provides a "coloring book" for a child.

In some embodiments, captured digital images can be processed by the processor 292 to provide a different image appearance in response to the image content of the captured image. For example, the processor 292 can determine the location of multiple faces within the image and automatically crop the captured digital image using different aspect ratios for different captured images in order to produce a more suitable appearance in the photo product.

In some embodiments, the captured digital images can be processed by the processor 292 to provide a different image appearance in response to the location where the image was captured. For example, the processor 292 can provide a "cartoon" effect for images captured in a particular location, such as images captured in a particular park or playground.

In some embodiments, the captured digital images can be processed by the processor 292 to provide a different image appearance in response to both the image content of the captured image and the location where the image was captured. For example, the processor 292 can provide a color-based object extraction algorithm (e.g. "green screen" effect") on images captured in a particular location when the processor 292 can determine that a background area of the captured image is a predetermined color (e.g. green). The communications network 250 enables communication with a fulfillment provider 270. The fulfillment provider 270 produces and distributes enhanced photo products. The fulfillment provider 270 includes a fulfillment web server 272, and a fulfillment computer system 276 that further includes a commerce manager 274 and a fulfillment manager 275. Fulfillment requests received from service provider 280 are handled by commerce manager 274 initially before handing the requests off to fulfillment manager 275. Fulfillment manager 275 determines which equipment is used to fulfill the ordered good(s) or services such as a digital printer 278 or a DVD writer 279. The digital printer 278 represents a range of color hardcopy printers that can produce various photo products, including prints and photo albums. The hardcopy prints can be of various sizes, including "poster prints", and can be sold in frames. The DVD writer 279 can produce CDs or DVDs, for example PictureCDs, having digital still and video images and application software for using the digital images.

After fulfillment, the photo products are provided to the user of the camera phones 300A, 300B, or to a recipient designated by the user of the camera phone 300sA, 300B. In some embodiments, the photo products are provided using a transportation vehicle 268. In other embodiments, the photo products are provided at a retail outlet, for pickup by the user of the camera phones 300A, 300B, or by a designated recipient.

System 214 also includes one or more kiosk printers 224 which communicate with the communication network 250 and service provider 280 via a communication service provider (CSP) 222. This enables printed photo products, created by the service provider 280 using digital images captured by camera phones 300A, 300B, to be provided at retail establishments.

System 214 also includes one or more customer computers 218 which communicate with the communication network 250 and service provider 280 via a communication service provider (CSP) 220. This enables photo products, created by the service provider 280 using digital images captured by camera phones 300A, 300B, to be ordered at a later time by the user of the camera phones 300A, 300B, or by others who are authorized by the user of the camera phones 300A, 300B.

It will be understood that in some embodiments, a plurality of service providers 280, fulfillment providers 270 or kiosk printers 224 can be located at a plurality of different retail outlets. For example, fulfillment providers 270 can be located in a portion of a store which is near a vacation spot or other attraction. In some embodiments, the user of the camera phones 300A, 300B can be guided to the location of a nearby fulfillment provider 270 in order to pick up a photo product that has been produced using their captured digital images. In some embodiments, the user of the camera phones 300A, 300B receives the photo product at a discount, or free of charge, in order to encourage the user to enter the store where they will potentially purchase other items. In some embodiments, the photo product includes advertising of merchants which are located near the location of the fulfillment provider 270.

In some embodiments, the service provider 280, or the fulfillment provider 270 can create examples of various photo products that can be provided by the fulfillment provider 270, as described in commonly-assigned U.S. Pat. No. 6,915,723 entitled "Method For Providing Customized Photo Products Over A Network" by Parulski et al., the disclosure of which is incorporated herein by reference. The examples can be communicated to the camera phone 300 or the customer computer 218, where the examples can be displayed to the user.

In some embodiments, the customer database 288 at the service provider 280 includes information describing customer accounts for a plurality of users, including user billing information. The billing information can include a payment identifier for the user, such as a charge card number, expiration date, user billing address, or any other suitable identifier. In some embodiments, the customer database 288 also provides long-term storage of the uploaded images for some or all of the users. In some embodiments, stored images are accessible (e.g., viewable) via the Internet by authorized users. Users can be authorized to view, print, or share images as described in commonly-assigned U.S. Pat. No. 5,760,917, entitled "Image distribution method and system" to Sheridan, the disclosure of which is incorporated herein by reference.

When a photo product is purchased by the user of the camera phones 300A, 300B, the service provider account manager 284 can communicate with a remote financial institution (not shown) to verify that the payment identifier (e.g., credit card or debit card number) provided by the customer is valid, and to debit the account for the purchase. Alternatively, the price of the photo product can be added to the user's monthly bill paid to the service provider 280 or to their mobile phone operator.

It will be understood that in some embodiments, the functions of the service provider 280 and the fulfillment provider 270 can be combined, for example, by using a common web server for both web server 282 and web server 272 or by combining the functions of the account manager 284, the commerce manager 274, and the fulfillment manager 275. It will be understood that in some embodiments, the customer database 288 or the custom content database 290 can be distributed over several computers at the same physical site, or at different sites.

Figure 2:
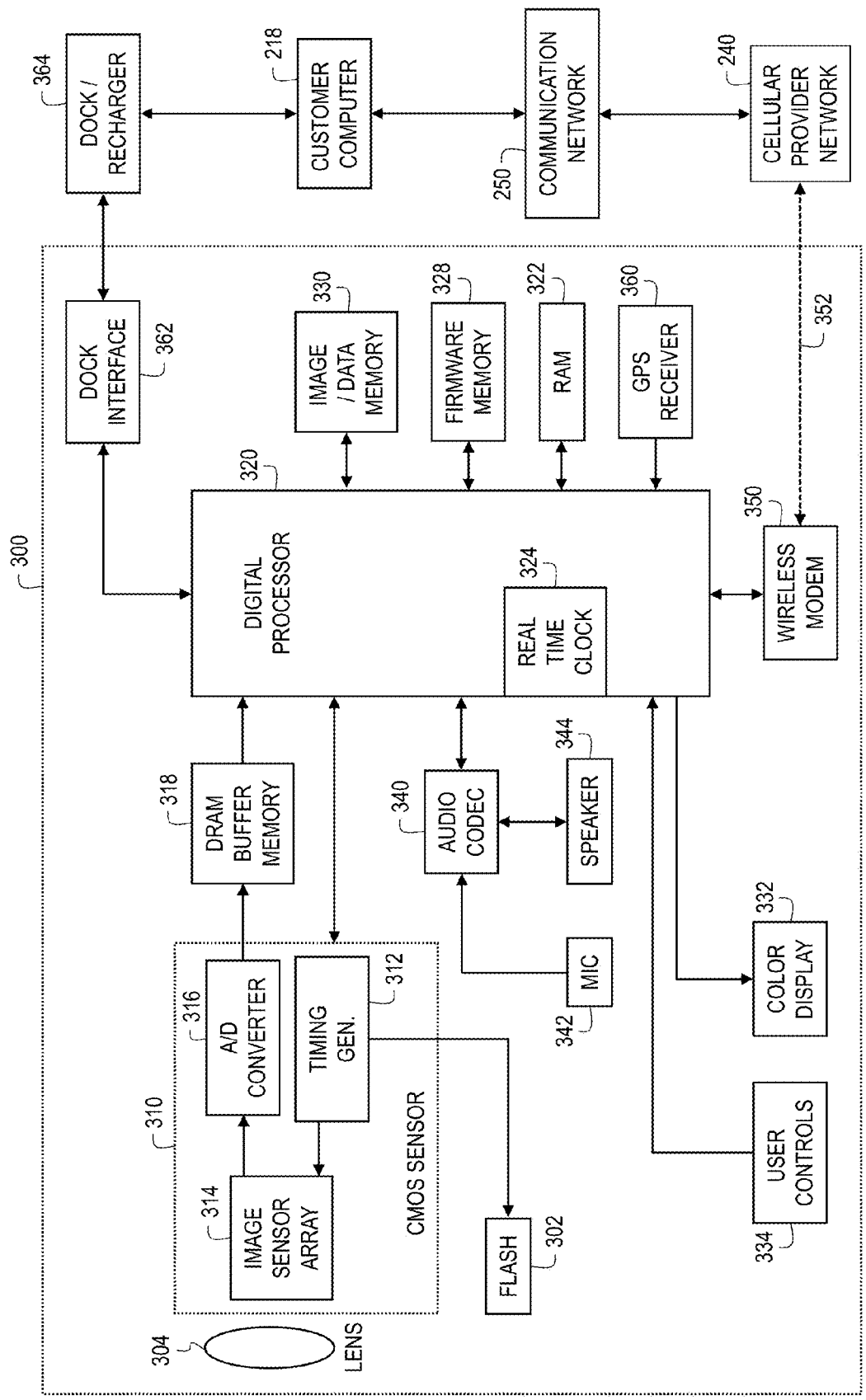
FIG. 2 is a block diagram of a camera phone used in the digital imaging system of FIG. 1.

FIG. 2 depicts a block diagram of a camera phone 300 used in the digital photography system of FIG. 1. The camera phone 300 can send and receive email messages and text messages which include images. It will be understood that other types of image capture devices, such as a wireless digital camera, can be used in the system described in reference to FIG. 1. The camera phone 300 or other type of image capture device can also include other functions, including, but not limited to, the functions of a digital music player (e.g. an MP3 player), a GPS receiver, or a programmable digital assistant (PDA).

The camera phone 300 is a portable battery operated device, small enough to be easily handheld by a user when capturing and reviewing images. The camera phone 300 includes a lens 304 which focuses light from a scene (not shown) onto an image sensor array 314 of a CMOS image sensor 310. The image sensor array 314 can provide color image information using the well-known Bayer color filter pattern. The image sensor array 314 is controlled by timing generator 312, which also controls a flash 302 in order to illuminate the scene when the ambient illumination is low. The image sensor array 314 can have, for example, 2560 columns×1920 rows of pixels.

In some embodiments, the digital camera phone 300 can also store video clips by summing multiple pixels of the image sensor array 314 together (e.g. summing pixels of the same color within each 4 column×4 row area of the image sensor array 314) to create a lower resolution video image frame. The video image frames are read from the image sensor array 314 at regular intervals, for example using a 30 frame per second readout rate.

The analog output signals from the image sensor array 314 are amplified and converted to digital data by the analog-to-digital (A/D) converter circuit 316 on the CMOS image sensor 310. The digital data is stored in a DRAM buffer memory 318 and subsequently processed by a digital processor 320 controlled by the firmware stored in firmware memory 328, which can be flash EPROM memory. The digital processor 320 includes a real-time clock 324, which keeps the date and time even when the digital camera phone 300 and digital processor 320 are in their low power state. The digital processor 320 produces digital images that are stored as digital image files using image/data memory 330. The phrase "digital image" or "digital image file", as used herein, refers to any digital image file, such as a digital still image or a digital video file.

The processed digital image files are stored in the image/data memory 330, along with the date/time that the image was captured provided by the real-time clock 324 and the location information provided by GPS receiver 360. The image/data memory 330 can also be used to store other information, such as phone numbers or appointments. In some embodiments, the camera phone 300 is a smart phone, and the digital processor 320 uses a software stack, such as Android, which includes an operating system, middleware, and applications. This permits a software application ("APP") to be downloaded, stored in the firmware memory 328, and used to provide various functions.

In some embodiments, the digital processor 320 performs color interpolation followed by color and tone correction, in order to produce rendered sRGB image data. In some embodiments, the digital processor 320 can also provide various image sizes selected by the user. In some embodiments, rendered sRGB image data is then JPEG compressed and stored as a JPEG image file in the image/data memory 330. In some embodiments, the JPEG file uses the so-called "Exif" image format. This format includes an Exif application segment that stores particular image metadata using various TIFF tags. Separate TIFF tags are used to store the date and time the picture was captured and the GPS co-ordinates, as well as other camera settings such as the lens f/number.

In some embodiments, the digital processor 320 also creates a low-resolution "thumbnail" size image, which can be created as described in commonly-assigned U.S. Pat. No. 5,164,831 entitled "Electronic Still Camera Providing Multi-Format Storage Of Full And Reduced Resolution Images" to Kuchta, et al., the disclosure of which is herein incorporated by reference. The thumbnail image can be stored in RAM memory 322 and supplied to a color display 332, which can be, for example, an active matrix LCD or organic light emitting diode (OLED). After images are captured, they can be quickly reviewed on the color LCD image display 332 by using the thumbnail image data.

The graphical user interface displayed on the color display 332 is controlled by user controls 334. The graphical user interface enables the user to control the functions of the camera phone 300, for example, to capture still or video images, and to send or view text messages or email messages. User controls 334 typically include some combination of buttons, rocker switches, or joysticks. In some embodiments, many of the user controls 334 are provided by using a touch screen overlay on the color display 332. In other embodiments, the user controls 334 can include a means to receive input from the user or an external device via a tethered, wireless, voice activated, visual or other interface. In other embodiments, additional status displays or images displays can be used.

An audio codec 340 connected to the digital processor 320 receives an audio signal from a microphone 342 and provides an audio signal to a speaker 344. These components can be used both for telephone conversations and to record and playback an audio track, along with a video sequence or still image. The speaker 344 can also be used to inform the user of an incoming phone call. This can be done using a standard ring tone stored in firmware memory 328, or by using a custom ring-tone downloaded from the service provider 280. In addition, a vibration device (not shown) can be used to provide a silent (e.g., non audible) notification of an incoming phone call, e-mail, or text message.

A dock interface 362 can be used to connect the camera phone 300 to a dock/charger 364, which is connected to the customer computer 218. The dock interface 362 can conform to, for example, the well-know USB interface specification. Alternatively, the interface between the digital camera phone 300 and customer computer 218, can be a wireless interface, such as the well-known Bluetooth wireless interface or the well-know 802.11b wireless interface. The dock interface 362 can be used to download image files (which include the date/time and GPS coordinates) from the image/data memory 330 to the customer computer 218. The dock/charger 364 can also be used to recharge the batteries (not shown) in the digital camera phone 300.

The digital processor 320 is coupled to a wireless modem 350, which enables the digital camera phone 300 to transmit and receive information via an RF channel 352. The wireless modem 350 communicates over a radio frequency (e.g. wireless) link with the cellular provider network 240, which can utilize, for example, a CDMA network, a 3GSM, a 4 GSM network, or other wireless communication networks.

It will be understood that the functions of digital processor 320 can be provided using a single programmable processor or by using multiple programmable processors, including one or more digital signal processor (DSP) devices. Alternatively, the digital processor 320 can be provided by custom circuitry (e.g., by one or more custom integrated circuits (ICs) designed specifically for use in camera phones), or by a combination of programmable processor(s) and custom circuits. It will be understood that connectors between the digital processor 320 from some or all of the various components shown in FIG. 2 can be made using a common data bus. For example, in some embodiments the connection between the digital processor 320, the DRAM buffer memory 318, the image/data memory 330, and the firmware memory 328 can be made using a common data bus.

Figure 3:
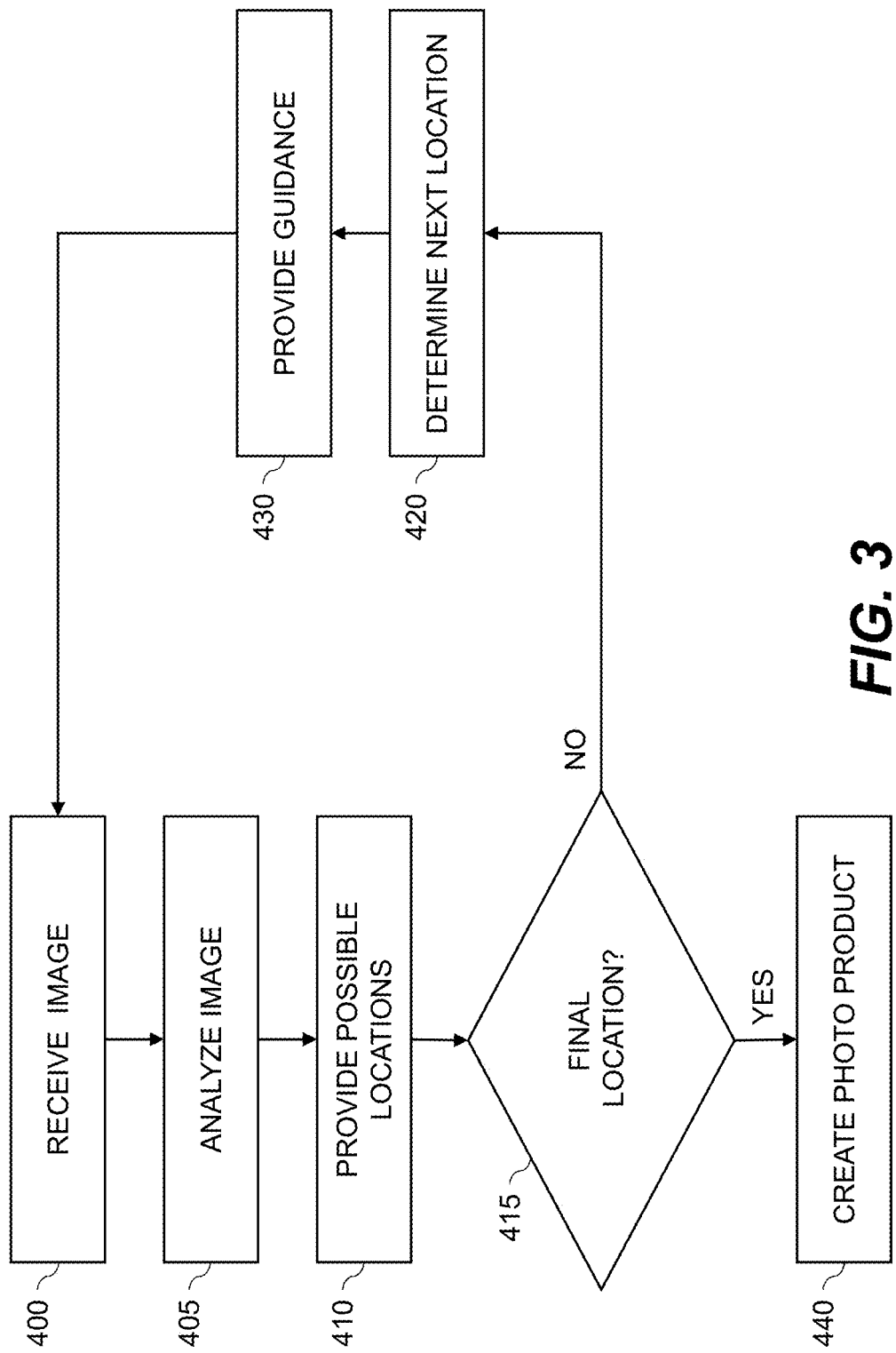
FIG. 3 is a high level flow diagram depicting steps for providing guidance for image capture at different locations.

FIG. 3 is a high level flow diagram depicting steps for providing guidance for image capture at different locations. In some embodiments, all of the steps are performed by the service provider 280 in FIG. 1. In other embodiments, some or all of the steps are performed by the camera phone 300 in FIG. 2. The guidance that is provided enables user experiences where images are being captured and the pixel data of the captured image is analyzed so that the experience can be dynamically modified based on information determined as a result of the analysis of the captured images.

As a first example, determining that there are children playing the game can alter the difficulty of the game (to make it easier) or the locations that the guidance suggests as the next scene to be captured (to be more appropriate for children). As a second example, determining that there is a large group of people in the image can cause the experience to be dynamically modified so that the group is given different tasks, at different locations, than would be the case with single individuals or couples. In some embodiments, the experience can be dynamically altered based on ambient condition information, such as the time of day (e.g. whether it is morning, afternoon, or evening) or the weather conditions (e.g. whether it is snowing, rainy, or sunny). In some embodiments, the ambient condition information includes geolocation information, such as GPS metadata.

In receive image step 400 of FIG. 3, a captured image is received. In some embodiments, the image is received by a server, such as the web server 282, over a communication network, such as communication network 250. In some embodiments, the image and accompanying data (such as the date and time of image capture, and the GPS location) is transmitted from a camera phone 300 over the communication network 250. In some embodiments, the image and accompanying data is transmitted in association with a text message, which can be transmitted using the MMS (Multimedia Messaging Service) protocol.

Upon receiving the message, the web server 282 can identify the customer or user. In some embodiments, the customer or user is identified by the telephone number of the camera phone 300 that is transmitted with the MMS message. The image and accompanying data are then stored in the customer database 288.

In analyze image step 405 of FIG. 3, the pixel data of the received digital image is analyzed. In some embodiments, the pixel data of the received digital image is analyzed by the processor 292 in the computer system 286. The analysis uses one or more digital image analysis techniques in order to determine additional metadata from the pixel data of the received image. These digital image analysis techniques can include, for example, semantic analysis, feature point identification, color map identification, facial identification, facial recognition, age recognition, and color or light balance analysis.

In some embodiments, the digital image analysis is performed responsive to other image metadata, such as geographic location data or time of day data. For example, the digital image analysis can use a database related to landmarks at different locations, and the pixel data of the received image can be analyzed to determine if any of the objects depicted in the image are likely to be one of the landmarks in the vicinity of the geographic location metadata associated with the received digital image. The newly determined metadata, for example the number of persons depicted in the received image, or the approximate age of one of more of the persons depicted in the received image, can be stored in the customer database 288.

In some embodiments, the analysis of the image can permit the service provider 280 to determine whether or not the user captured an image consistent with an intended objective provided by the service provider 280, prior to receiving the captured digital image in receive image step 400. In such embodiments, analyze image step 405 can determine that the received digital image is not consistent with the intended objective since it does not meet a predetermined criteria. For example, the pixel data of the received image might not include a landmark that the user was asked to find and photograph. In another example, the geographic location data associated with the image might not correspond to the location that the user was asked to find and photograph. In either example, the service provider 280 can provide additional guidance to the user, in order to provide additional instructions or "hints" that help the user locate the landmark or location.

In provide possible locations step 410, a plurality of possible locations is provided, so that a suitable next possible image capture location can be determined by selecting one of the plurality of possible locations. In some embodiments, the account manager 284 and the customer database 288 in the computer system 286 are used to determine user specific information related to the history of the user's interactions with the system, as well as any previously captured or determined information about the user's experience. For example, in a "treasure hunt" type scenario to be described later, the user may be known to be traveling a particular branch of a predefined hunt route. Further, it may be known that the user has already completed three stages of the hunt and that previous stages have indicated the user was outside on a bright sunny day.

In some embodiments, in provide possible locations step 410, the custom content database 290 is accessed to determine the set of all possible next locations that could be sent to the user, given the user's history.

In final location test 415, a determination is made as to whether the experience for this user should be concluded (yes to test 415) or whether there is at least one additional image to be captured by the user (no to test 415).

In some embodiments, this determination is made based on a user's known position on a predefined route. For example, when the user is near a particular printing location, the experience for this user can be terminated and guidance can be provided to the user in order to instruct the user to pick up their free photo product at the nearby location.

In some embodiments, this determination can be made based on explicit instructions the user conveyed in the most recent experience interaction. For example, when the experience begins, guidance can be provided to the user to inform the user that the experience can be ended when the user sends a particular text message (e.g. "end") from the camera phone 300 to the service provider 280.

In some embodiments, this determination can be made based on the elapsed time between the beginning of the experience interaction and the current time of day. For example, the experience can be automatically terminated after a predetermined time period (e.g. 30 minutes) has elapsed.

In some embodiments, this determination can be made based on ambient conditions, such as the current weather, the time of day, or safety related ambient condition information. For example, the experience can be automatically terminated if there is a severe weather storm in the area, after the sun sets, or if a fire, crime, or other safety related incident occurs in the vicinity.

If there is at least one additional image to be captured by the user (no to final image test 415), then in determine next location step 420, one of the plurality of next possible image capture locations is selected. In some embodiments, the computer system 286 in the service provider 280 determines the next possible image capture location based on the result of analyzing the pixel data of the received captured digital image in analyze image step 405, such as whether there are any children depicted in the captured digital image. In some embodiments, ambient condition information (such as whether it is a bright sunny day) is also used to automatically determine the most appropriate next location from the set of possible next locations.

In provide guidance step 430, guidance is provided to the user concerning the next possible image capture location that was determined in determine next location step 420. In some embodiments, the computer system 286 accesses the custom content database 290 to select the guidance appropriate to the next location selected in determine next location step 420. In some embodiments, the guidance is then transmitted over communication network 250 to the user's camera phone 300. The guidance will typically be in the form of image and text data, such as an MMS message, but can be of any format or type suitable for transmission over the communication network 250.

In some embodiments, the guidance to the user can be provided by placing a phone call to the camera phone 300 for the particular user, using the phone number provided in the MMS message which included the captured digital image. The phone call can provide one of a plurality of prerecorded messages which provides the guidance for the next location which was determined in determine next location step 420. For example, the prerecorded message can be recorded by an actor, pretending to be a historic figure associated with the theme of the user experience. The prerecorded message can describe, in a historic context, the next scene to be captured at the next location.

In some embodiments, the guidance to the user can include dynamically constructed images using the user's submitted image in combination with prestored information. In some embodiments, the user's submitted image can be modified and composited with prestored information. For example, the processor 292 in the computer system 286 can process the received captured image in order to crop out a face of a person depicted in the image, convert the face from a color to a monochrome image, and composite the image of the face into one of a plurality of prestored newspaper templates, so that the newly captured images appears to be a photograph in a historic newspaper related to a historic site which serves as the theme of the experience. The newspaper text can describe the next scene to be captured at the next location which was determined in determine next location step 420. The newspaper text can be modified based on text entered by the user of the camera phone 300. For example, the headline of the newspaper can read "Matt hunts the ghost of Sam Patch", or alternately "Troop 79 hunts the ghost of Sam Patch" if the user entered "Matt" or "Troop 79" as the individual or group name, in response to earlier guidance provided to the user of the camera phone 300.

In some embodiments, the service provider 280 provides experience specific content advertisements, or coupons specific to the user's experience, over the communication network 250 to the camera phone 300. These advertisements can be transmitted over communication network 250 as independent messages, or bundled into the response generated by provide guidance step 430.

In some embodiments, the user's submitted image can be modified and composited with prestored information in order to create the advertisements or coupons. In some embodiments, a particular advertisement is selected from a plurality of possible advertisements based on various criteria. The criteria can include, for example, the approximate age of one or more of the persons depicted in the captured digital image. For example, if the captured digital image includes one or more children, the particular advertisement can be for an age-appropriate book or toy related to the theme of the experience. The criteria can also include, for example, weather related information such as the current temperature. For example, on warm days the advertisement can provide an offer related to a discount on an ice cream cone at a first nearby merchant, and on cold days the advertisement can provide an offer related to a discount on a hot drink at second nearby merchant. In some embodiments, the coupons can be for a limited time period, based on the date and time ambient condition information. In some embodiments, the coupons can customized so that they can only be used by the particular user of the camera phone 300. This can be done, for example, by including one of the digital images captured by the user, as part of the coupon.

In some embodiments, the user of the camera phone 300 can send a message which rejects the next location determined in determine next location step 420. In response, the service provider 280 can determine an alternative next location and transmit guidance to the user which includes information concerning the alternate second location. For example, the user can decide to reject the next location based on the difficulty in finding the next location.

If there are no more images to be captured by the user (yes to final location test 415), then one or more photo products is created in created photo product block 440. The photo products use a combination of the images received from the user during the experience as well as prestored content. In some embodiments, the prestored content is selected based on analyzing the pixel data of one or more captured digital images in analyze image step 405. The photo products can be created as will be described in more detail in reference to FIG. 5.

In some embodiments, some or all of the steps described in reference to FIG. 3 can be provided by an image capture device, such as camera phone 300. In some embodiments, the camera phone 300 is a smart phone, and the service provider 280 provides a downloadable software application ("APP") over the communication network 250 to the camera phone 300. The camera phone 300 is one example of an image capture device, and includes an image sensor array 314 for capturing a digital image of a scene, a color display 332, a digital processor 320 which serves as a data processing system, image/data memory 330 which serves as a storage memory for storing captured images; and firmware memory 328 which serves as a program memory. The firmware memory 328 is communicatively connected to digital processor 320.

In this example, the instructions provided in the APP can control the digital processor 320 in order to display, on the color display 332, guidance information for capturing a first digital image at a first location; and enable the camera phone 300 to capture a first digital image using the image sensor array 314 and store the first digital image in image/data memory 330. The instructions provided in the APP can then control the digital processor 320 in the camera phone 330 to analyze the pixel data of the first digital image and to determine a second possible image capture location from a plurality of different possible locations provided by the APP.

The instructions provided in the APP can then control the digital processor 320 in the camera phone 300 to display, on the color display 332, guidance information for capturing a second scene at the selected second location, and enable the camera phone 300 to capture a second digital image using the image sensor array 314, and store the second digital image in image/data memory 330.

In some embodiments, the instructions provided in the APP can cause the digital processor 320 to provide guidance to the user concerning an alternate second location responsive to an input provided, using a user interface such as the user controls 334, rejecting the second location.

In some embodiments, the first and second captured images are transmitted to the service provider 280 over the wireless modem 350, so that the service provider 280 can create one or more photo products using the first and second captured digital images.

In some embodiments, the pixel data of the first digital image is analyzed to determine how many people are depicted in the first digital image, to determine the approximate age of at least one person depicted in the first digital image, or to determine at least one landmark depicted in the first digital image, as was described earlier in reference to analyze image step 405.

In some embodiments, a wireless interface, such as wireless modem 350, receives ambient condition information over a wireless network from a provider, such as a weather service provider. The digital processor 320 in the camera phone 300 uses the received ambient condition information when selecting the second possible image capture location, as was described earlier. The ambient condition information can include, for example, weather information, geographic location information and time of day information.

Figure 4B:
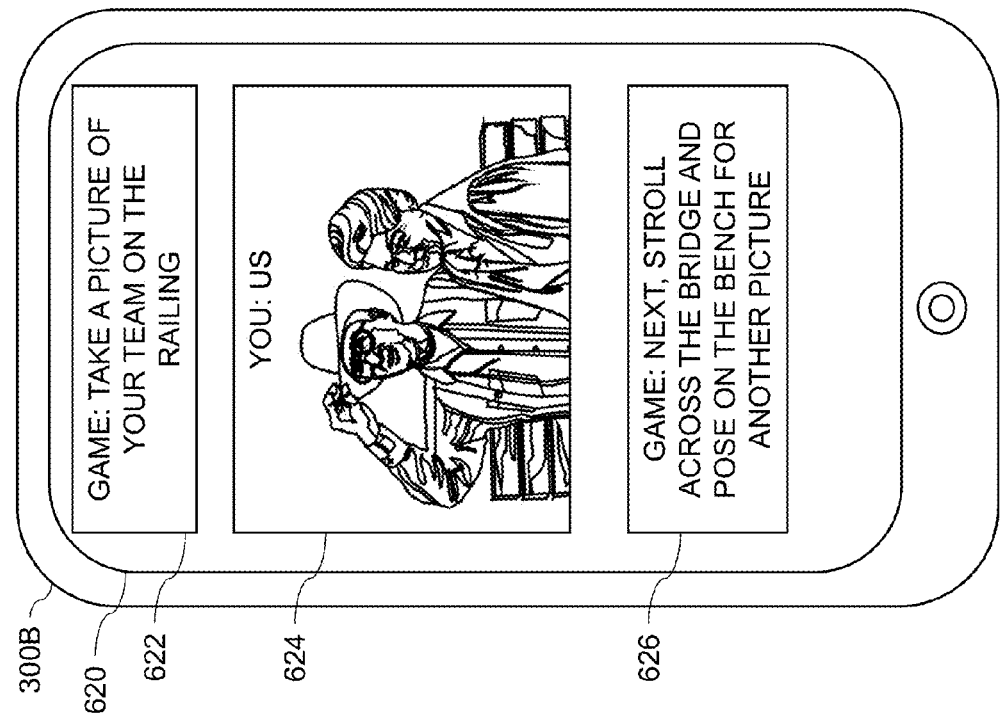
FIG. 4A and FIG. 4B depict two different examples of guidance for image capture at different locations based on an analysis of the previous image received.
Figure 4A:
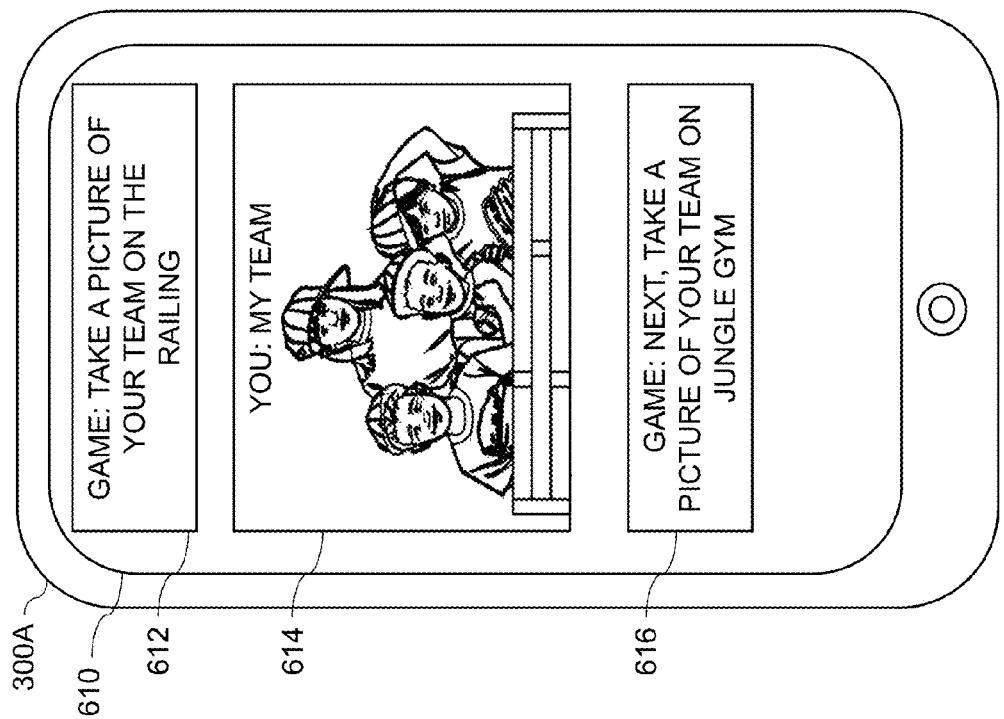

FIG. 4A and FIG. 4B depict two different examples of guidance for image capture at different locations based on an analysis of the previous image received from the user of one of the camera phones 300A (FIG. 4A) and 300B (FIG. 4B). In both examples, the initial guidance provided by the service provider 280 and transmitted over the communications network 250 to the camera phones 300A, 300B is to take a picture of your team on the railing, as depicted in the initial guidance portion 612 of the user interface display screen 610 in FIG. 4A and the initial guidance portion 622 of the user interface display screen 620 in FIG. 4B.

In the example of FIG. 4A, the image received from the user of camera phone 300A is a first user captured picture 614 depicting four children. In the example of FIG. 4B, the image received from the user of camera phone 300B is a second user captured picture 624 of an older couple. In some embodiments, analyze image step 405 determines the number of people in the captured digital images, and the approximate age of one or more the individuals in the captured digital images, and stores such determinations as metadata in the customer database 288.

Subsequently, in determine next location step 420, the processor 292 in the computer system 286, or the digital processor 320 in the camera phone 300, uses these image specific determinations to automatically select the most appropriate next location. In the case of the children in the example of FIG. 4A, the Jungle Gym was selected as the next location and appropriate guidance for the Jungle Gym location is displayed in next location message area 616 of the user interface display screen 610 in FIG. 4A. In the case of the older couple in the example of FIG. 4B, the Park Bench was selected as the next location, and appropriate guidance for the Park Bench location is displayed in next location message area 626 of the user interface display screen 620 in FIG. 4B. In both examples, the next location was selected based on information determined from analyzing the pixel data of the received image.

Figure 5:
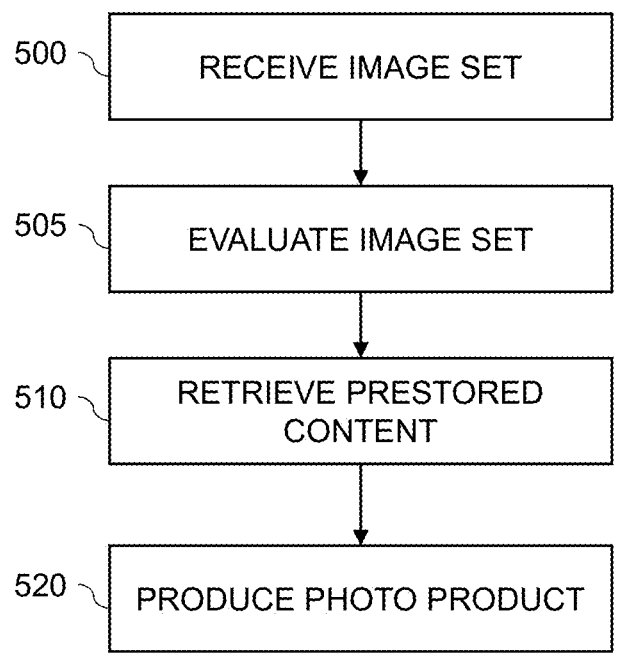
FIG. 5 is a high level flow diagram depicting steps for generating a photo product from images captured at different locations.

FIG. 5 is a high level flow diagram depicting steps for generating photo products from images captured at different locations. The photo products are produced using captured images received from users of camera phone 300, along with prestored content provided by service provider 280. In some embodiments, the prestored content is selected responsive to information determined by analysis of the pixel data of the captured images received from user of camera phone 300.

In receive image set step 500, an image set including some, or all, of the images captured by the user during the experience described in relation to FIG. 3 is received, for example by retrieving the set of images from the customer database 288. In some embodiments, any text entered by a user, such as a team name or the names of the participants, is also retrieved. In some embodiments, geographic location metadata or other information collected or determined during the experience is retrieved, as well as any known information about the customer, and any data, images, or information returned to the user during the experience.

In evaluate image set step 505, the digital processor 292 in the computer system 286, or the processor 320 in the camera phone 300, analyzes the images taken at different locations, which were retrieved in receive image set step 500, according to predetermined criteria and selects images meeting such criteria. In some embodiments, a predetermined number of images is selected, and at least one of the selected images relates to each of a plurality of different locations.

In some embodiments, evaluate image set step 505 analyzes previously determined metadata associated with images that was determined in analyze image step 405 of FIG. 3. For example, the metadata associated with one or more images of the image set can be evaluated to determine whether the image includes a particular landmark. In this example, the predetermined criteria can relate to whether the analyzed image includes the particular landmark.

In some embodiments, evaluate image set step 505 analyzes metadata associated with the captured digital images received in receive image step 400 of FIG. 3. In this example, the predetermined criteria can relate to whether the analyzed image was captured within a predetermined area.

In some embodiments, evaluate image set step 505 analyzes both metadata associated with the captured digital images received in receive image step 400 of FIG. 4 and previously determined metadata associated with images that was determined in analyze image step 405 of FIG. 3. In this example, the predetermined criteria can relate to whether the analyzed image was captured within a predetermined area and also includes the particular type of object (e.g. an image of a child, a certain color automobile, or a certain type of signpost).

In some embodiments, evaluate image set step 505 includes performing additional analysis on the pixel data of the received image set in receive image set step 500, in order to determine the relationships between images in the image set, or the consistency or quality of the images in the image set. For example, the image set can be evaluated to select a subset of images which contain the best composition, or provide the best exposed or focused images. As another example, the image set can be evaluated to select a subset of images which provide a consistent number of individuals in each image, or consistently feature the best pose (e.g. the best looking smile) of a particular person, such as a particular child.

In retrieve prestored content step 510, prestored information is retrieved from the custom content database 290. If the photo product to be produced is a printed photo product, such as a photo booklet, the prestored information can include images, graphics, text, or templates. If the photo product to be produced is a digital photo product, such as slide show or digital video clip, the prestored information can include audio information such as voice narration tracks or music tracks, or video information such as video clips describing a historic site, or video special effects templates or tracks.

In produce photo product step 520, a photo product is produced which includes the images selected in evaluate image set step 505 and the prestored content retrieved in retrieve prestored content step 510. The photo products that can be produced include, for example, printed pages, photo books, mugs, t-shirts, DVDs, social networking content, digital slide shows, or other products which utilize the captured images and the retrieved prestored information.

In some embodiments, the selected images from evaluate image set 505 are positioned in the photo product in association with prestored information that relates to the respective scenes depicted in the selected images, which were captured in a plurality of locations according to predetermined criteria.

In some embodiments, one or more of the images selected in evaluate image set step 505 can be modified and composited with prestored information. For example, the processor 292 in the computer system 286 can process the received captured image in order to crop out the face, convert the face from a color to a monochrome image, and composite the image of the face into a prestored newspaper template so that the selected image appears to be a photograph in a historic newspaper related to a historic site which serves as the theme of the experience.

Figure 6A:
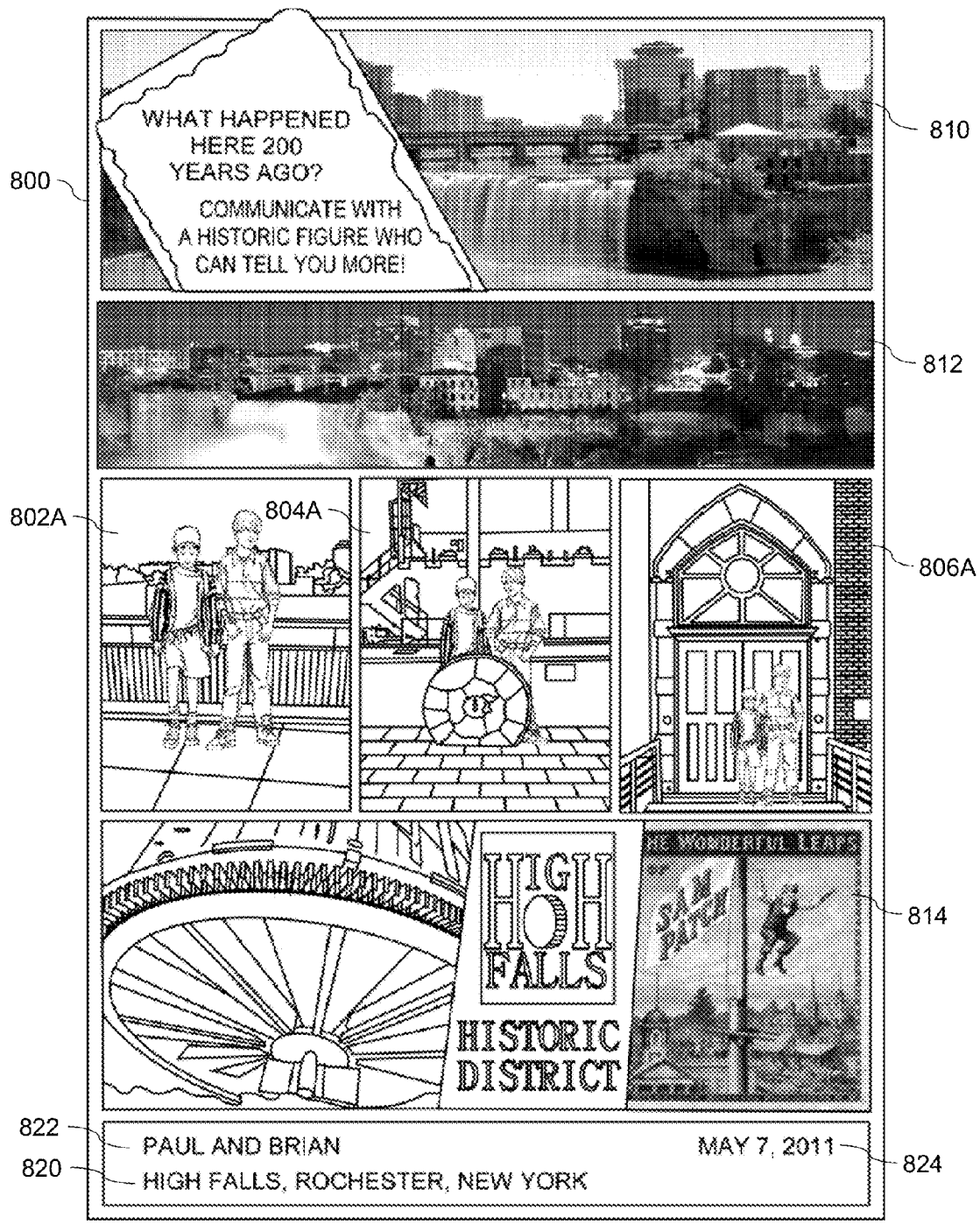
FIG. 6A-6C depict pages of a first photo product which includes selected images positioned in the photo product in association with prestored information.
Figure 6B:
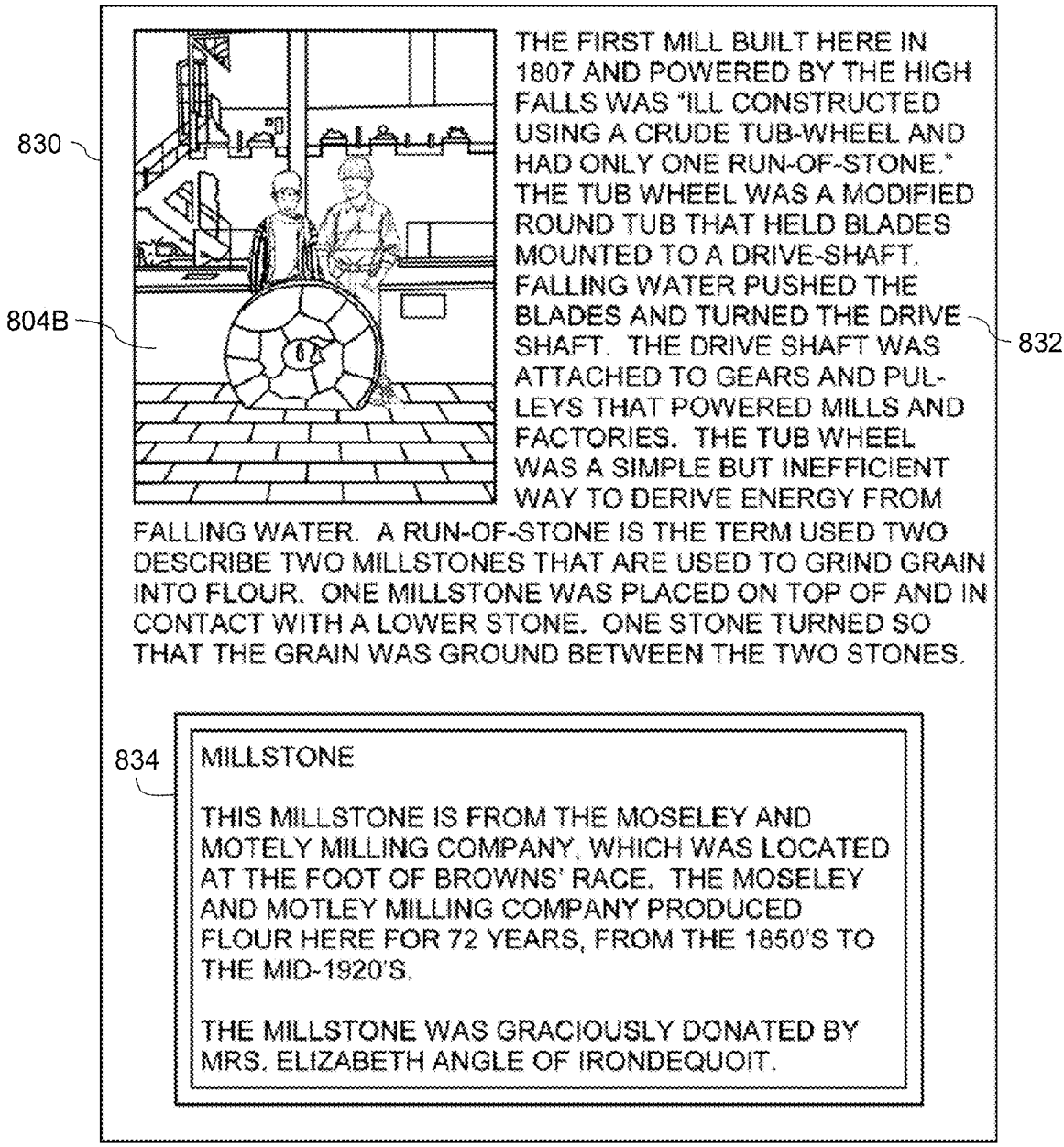
Figure 6C:
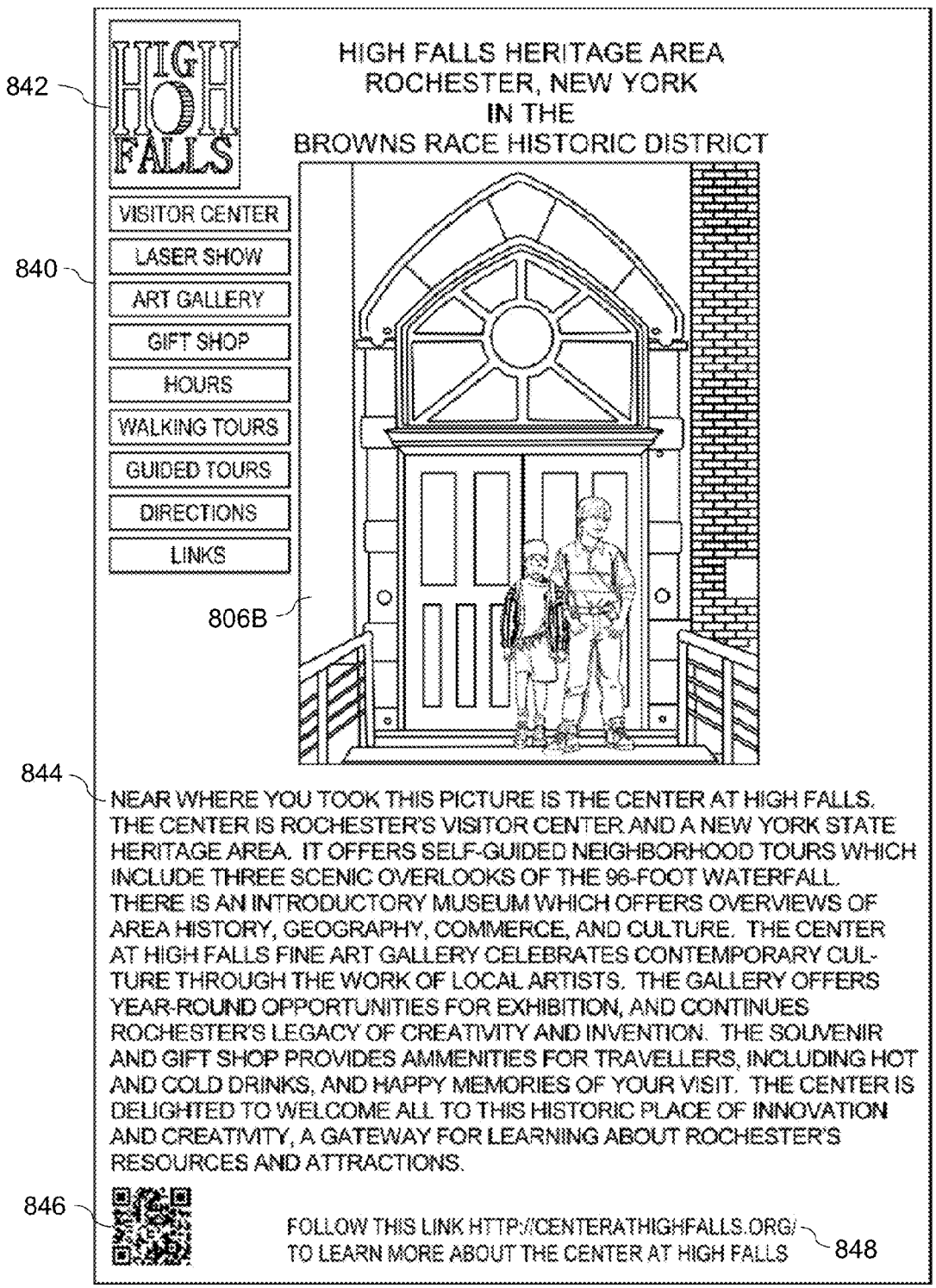

FIG. 6A-6C depict pages of a first photo product which includes selected images positioned in the photo product in association with prestored information. FIG. 6A depicts the first page 800 of the first photo product, which is a photo booklet. Page 800 is a cover page, and includes three images, 802A, 804A, and 806A, which were selected according to predetermined criteria. Images 802A, 804A, and 806A were captured by a particular user of a particular camera phone 300. Images 802A, 804A, and 806A were captured near the High Falls historic site in Rochester, N.Y. on May 7, 2011.

Images 802A, 804A, and 806A are positioned on page 800 in association with prestored information, such as a stored panoramic image 812 of the High Falls. The stored panoramic image 812 is one example of predetermined information that relates to the scene in the user captured image 802A, which was captured on the bridge overlooking the High Falls. Page 800 also includes a graphic drawing 810 which depicts the High Falls area approximately 200 years ago, and graphic drawing 814 that depicts a particular event (Sam Patch's jump from the High Falls). The graphic drawings 810 and 814 are also examples of predetermined information that relates to the scene in the user captured image 802A. Page 800 also includes a text message 820, "High Falls, Rochester, New York", which provides a title for the first page 800 of the photo product. The text 820 is also an example of predetermined information that relates to the scene in the user captured image 802A.

Page 800 also includes text 822 which personalizes the first page of the photo product 800 with the name of the participants "Paul and Brian" depicted in the images 802A, 804A, and 806A. The names can be determined from a text message received from the camera phone 300 in response to earlier guidance provided to the user of the camera phone 300. Page 800 also includes text 824 which personalizes the first page of the photo product 800 with the date on which the photo experience took place. The date can be determined from a real-time clock provided by the computer system 286 or by date information provided by the camera phone 300 as part of an MMS message which includes one of the captured images.

FIG. 6B depicts a second page 830 of the first photo product. Page 830 includes an image 804B which is a larger sized version of the image 804A that was included on the first page 800 in FIG. 6A. Page 830 also includes prestored text information 832 which describes the first mill that was built in the High Falls area. Page 830 also includes a prestored image 834, which depicts a plaque located near the millstone.

The image 804B was captured in front of a particular object, which is a millstone, in response to guidance provided to the user of the camera phone 300. In this example, the guidance to the user was to take a picture of their group near "a circle that came from an Angle". The image of the plaque depicted in prestored image 834 shows that the millstone was donated by Ms. Elizabeth Angle of Irondequoit, N.Y.

FIG. 6C depicts a third page 840 of the first photo product. Page 840 includes an image 806B which is a larger sized version the image 806A that was included on the first page 800 in FIG. 6A. Page 840 also includes prestored text information 844 which describes the Center at High Falls area. Page 840 also includes a prestored graphic 842, which provides a title and logo related to the location of image 806B, which was captured in front of the Center at High Falls, in the High Falls Heritage Area, a major tourist attraction in Rochester, N.Y.

The image 806B on page 840 was captured in response to guidance provided to the user of the camera phone 300. In this example, the guidance to the user was based on analyzing the pixel data of a previously captured image and the ambient conditions. The location was selected from a plurality of possible locations based on the time of day (which indicated that the Center at High Falls was currently open for visitors, and the number and approximate age of the individuals depicted in the previous captured images (802A and 804A).

The third page 840 also includes a machine readable code 846 and a human readable URL 848. In the specific example shown in FIG. 6C, the machine readable code 846 is the well-known QR (Quick Response) code, which is readable by many camera phones. The code consists of modules which are arranged in a square pattern on a white background. In this example, the information encoded in the QR code is a link to a website which provides additional information about the Center at High Falls, and the human readable URL 848 provides the same link as plain text. It will be understood that QR codes could also be used to provide electronic access to other images and information, such as the image file associated with the captured image 806B. The machine readable code 846 and the human readable URL 848 are also examples of predetermined information that relates to the scene in the user captured image 806B.

Figure 7A:
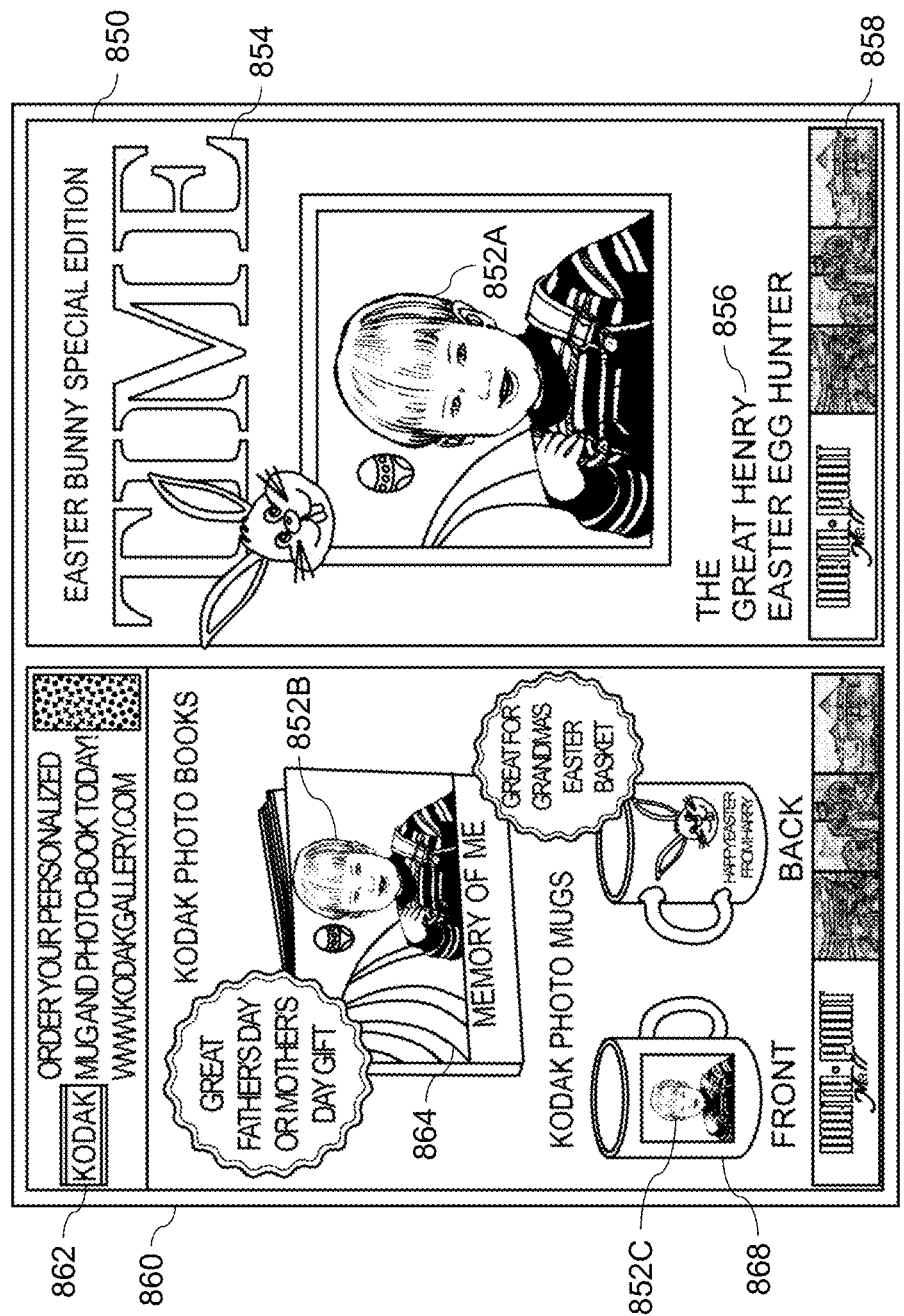
FIG. 7A-7C depict pages of a second photo product which includes selected images positioned in the photo product in association with prestored information.
Figure 7B:
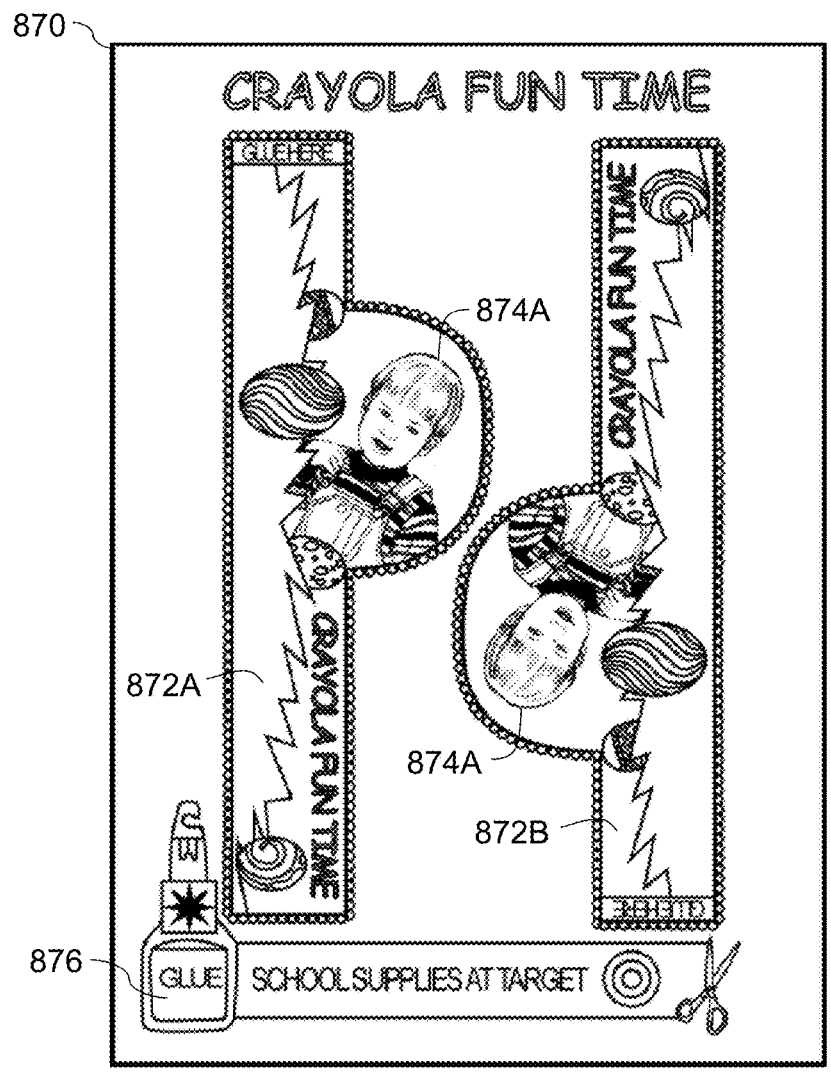
Figure 7C:
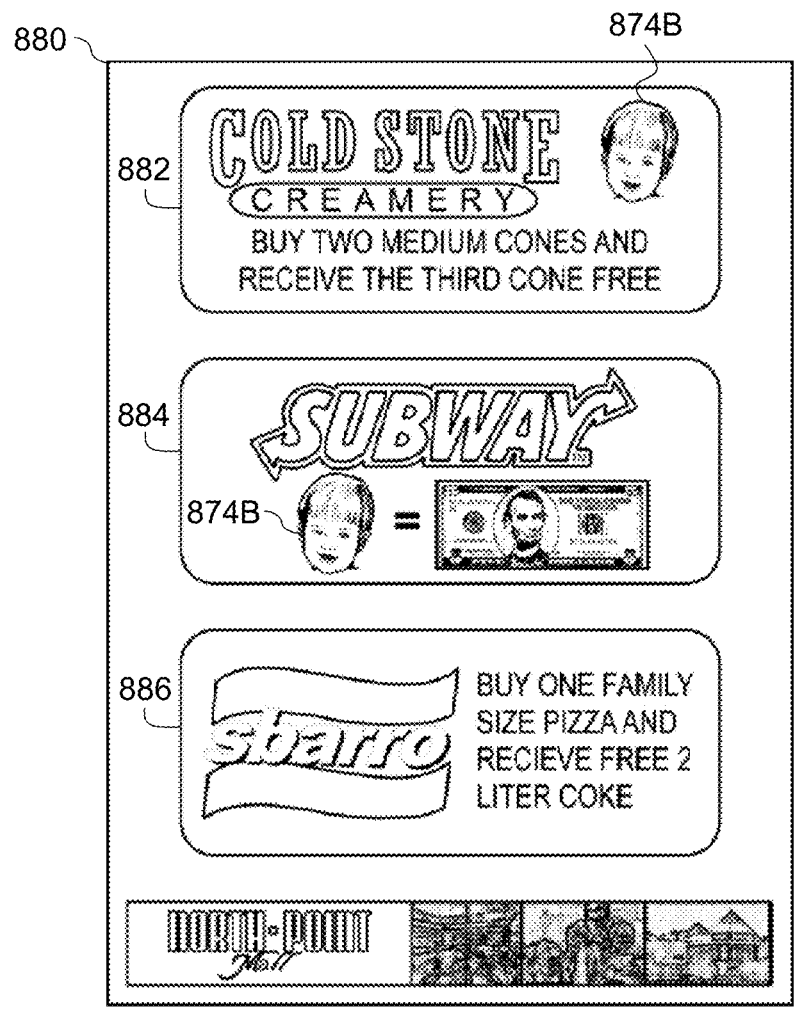

FIG. 7A-7C depict pages of a second photo product which includes selected images positioned in the photo product in association with prestored information. In this example, the photo product is provided as a multi-page digital document, such as a pdf file, which is provided to the user of the camera phone 300, for viewing and possible printing on the user's home printer. In other embodiments, the photo product can be printed at a retail establishment for pick-up by the user after the service provider 280 transmits information to the camera phone 300 related to where the printed booklet can be obtained. For example, the information can provide the name of a store or a map showing a route to the store, where the user of the camera phone 300 can pick up their "free photo booklet".

FIG. 7A depicts the first page 850 and the last page 860 of the second photo product. Page 850 is a cover page and includes one captured image, 852A, which was captured by a particular user of a particular camera phone 300 and selected according to predetermined criteria. In this example, the captured image 852A was captured by a parent of the child depicted in the image, in response to guidance which described a first location for capturing an image. The guidance was provided by an automated phone message from the "Easter Bunny" in response to a text message sent by the user of the camera phone 300 to a particular address specified on a sign in the North Point Shopping Mall. The phone message provided guidance to the parent and child to look for a particular colored Easter egg in a nearby area of the mall. The guidance further asked the parent to photograph their child in front of the Easter egg and to send an MMS message, including the photograph and the child's name, to a particular address.

In response to the guidance, the parent captured the requested image and transmitted the image file as part of an MMS message to the service provider. The text message included the child's name, "Henry" along with the image 852A. The received image was analyzed relative to predetermined criteria to determine if the image included both the face of a child and a portion of the particular colored Easter egg. Since the captured image 852A met the predetermined criteria, it was included on first page 850, along with prestored information including the text "Easter Bunny Special Edition" 854 and related graphics. The first page 850 also includes prestored graphics information 858 describing the location of the egg hunt (e.g. North Point Mall) and a title 856 "The GREAT HENRY Easter Egg Hunter" which includes the name of the child, "Henry", included in the text message.

FIG. 7A also depicts a last page 860 of the second photo product. The last page 860 includes an advertisement 862 for Kodak Photo Books and Kodak Photo Mugs which uses one of the captured digital images positioned with other prestored information. For example, the last page 860 depicts a photo book 864 which includes a captured image 852B that is a different sized and cropped version of the captured image 852A on the first page 850. The last page 860 also depicts a photo mug 868 which includes a captured image 852C that is a different sized and cropped version of the captured image 852A on the first page 850. Both the photo book 864 and photo mug 868 are examples of advertising information related to another product (e.g. a photo book or photo mug) which use at least one of the images captured using the camera phone 300 and also use prestored information to depict the product offering.

FIG. 7B depicts a second page 870 of the second photo product. The second page 870 includes objects 872A and 872B. Each of the objects 872A and 872B is intended to be cut out and glued together at the ends in order to form an Easter egg holder. Portions of the objects 872A and 872B can be colored by the child. The objects 872A and 872B include one of the captured images 874A which is positioned in the Easter egg holder photo product with prestored information, including graphic line drawings of Easter Eggs and other items which can be colored by the child. Second page 870 also includes prestored advertising information 876 related to the purchase of glue or other school supplies at a specific merchant (e.g. Target). In some embodiments, the prestored advertising information is selected based on the location of the user, so as to provide the name and location of a nearby merchant which offers supplies (e.g. glue or crayons) needed to properly complete the photo product.

FIG. 7C depicts third page 880 of the second photo product. The third page 880 includes three advertisements in the form of a first coupon 882, which provides a discount on ice cream cones, a second coupon 884, which provides a "cash equivalent" discount related to a sandwich merchant, and third coupon 886, which provides a discount related to a pizza merchant. The first coupon 882 includes a differently sized and cropped version of one of the captured images 874B which is positioned within the first coupon 882 along with prestored advertising related information. The second coupon 884 also includes a differently sized and cropped version of one of the captured images 874B which is positioned within the second coupon 884 along with other prestored advertising related information. In some embodiments, the prestored advertising information used for coupons 882, 884, and 886 is selected responsive to the number of persons depicted in the captured image or the approximate age of one or more of the persons depicted in the captured image, or responsive to the other metadata described earlier in reference to FIG. 3.

FIG. 8A and FIG. 8B depict examples of two different photo products which utilize images captured by two different users at the same location. The particular photo product provided to the two different users is determined based on analysis of the pixel data of captured images submitted by each of the two different users.

FIG. 8A depicts a first photo product 700, which can be a printed page or a composite digital image file that can be displayed on the color display 332 of the camera phone 300. The first photo product 700 includes a first user image 720 which was received from the user of a first camera phone 300A. First user image 720 depicts a young couple in front of the Eiffel Tower.

FIG. 8B depicts a second photo product 702 which can also be a printed page or a composite digital image file. The second photo product 702 includes a second user image 722 which was received from the user of a second camera phone 300B. Second user image 722 depicts three children in front of the Eiffel Tower. In both examples, the evaluate image set step 505 described in reference to FIG. 5 would have determined the location as being Paris and determined the numbers of people and approximate ages of the people in each photo.

The first prestored image content specific page title 710 for the first photo product 700 is appropriate to the content of the first user image 720 since "The Romance of Paris" likely reflects the young couple's experience. The second prestored image content specific page title 712 for the second photo product 702 is appropriate to the content of the second user image 722, since the children are more apt to view the Eiffel Tower as "The Paris Jungle Gym."

A first image content specific coupon 730, which offers a coupon for "1 free bottle of wine at Le Bistro", is appropriate to the content of the first user image 720, which was received from the user of camera phone 300A. A second image content specific coupon 732, which provides an offer of "buy 2 water bottles get 1 free at Le Gift shop" is appropriate to the content of the second user image 722, which was received from the user of camera phone 300B. The young couple is more likely to want to share a bottle of wine at a bistro, while a family with young children will be more inclined to get water and souvenirs in the gift shop. In addition, making an offer for a discount of a third item, when two similar items are purchased, is likely a more appropriate offer the family with three small children.

It will be understood, however, that in some embodiments, the selection of the prestored information, such as prestored advertising, used in the examples described in relation to FIG. 8A and FIG. 8B might be responsive to other factors. The factors can include preference information derived from explicit user input or past behavior, and additional analysis of the pixel data of the captured digital images, for example, to determine the expressions or demeanor of one or more people depicted in the set of images that are evaluated in the evaluate image set step 505 in FIG. 5. For example, the preference information for the user of camera phone 300A might indicate that the user does not drink alcohol. This could be determined by explicit user input provided at an earlier time or by storing the user behavior to previous offers and determining that the user has never taken advantage of an alcohol related offer in the past. In this situation, an offer for a discount related to bottled water might be more appropriate, even though analysis of the pixel data of the captured digital image has determined that the image includes young adults.

As a second example, the expressions or demeanor of the three children depicted in the images in FIG. 8B could be determined by analyzing the pixel data of the captured digital images. If such analysis indicates that the children have been in a disgruntled mood for an extended period of time, an offer that provides a discount on a glass of wine (or possibly a bottle of wine) at a nearby establishment might be welcomed by a parent or guardian who has spent a long afternoon taking photos of the three disgruntled children, using camera phone 300B.

In the foregoing detailed description, the method and apparatus of the present invention have been described with reference to specific exemplary embodiments thereof. It will, however, be evident that various modifications and changes can be made thereto without departing from the broader spirit and scope of the present invention. The present specification and figures are accordingly to be regarded as illustrative rather than restrictive.

A computer program product can include one or more storage medium, for example; magnetic storage media such as magnetic disk (such as a floppy disk) or magnetic tape; optical storage media such as optical disk, optical tape, or machine readable bar code; solid-state electronic storage devices such as random access memory (RAM), or read-only memory (ROM); or any other physical device or media employed to store a computer program having instructions for controlling one or more computers to practice the method according to the present invention.

The invention has been described in detail with particular reference to certain preferred embodiments thereof, but it will be understood that variations and modifications can be effected within the spirit and scope of the invention.

PARTS LIST

214 System
218 Customer Computer
220 Communication Services Provider (CSP)
222 Communication Services Provider (CSP)
224 Kiosk Printer
240 Cellular Provider Network
250 Communication Network
268 Transportation Vehicle
270 Fulfillment Provider
272 Web Server
274 Commerce Manager
275 Fulfillment Manager
276 Fulfillment Manager
278 Digital Printer
279 DVD Writer
280 Service Provider
282 Web Server at Service Provider
284 Account Manager
286 Computer System
288 Customer Database
290 Custom Content Database
292 Processor
300A Camera phone at location A
300B Camera phone at location B
300 Camera phone
302 Flash
304 Lens
310 CMOS Image Sensor
312 Timing Generator
314 Image Sensor Array
316 A/D Converter
318 DRAM Buffer Memory
320 Digital Processor
322 RAM
324 Real Time Clock
328 Firmware Memory
330 Image/Data Memory
332 Color Display
334 User Controls
340 Audio Codec
342 Microphone
344 Speaker
350 Wireless Modem
352 RF Channel
360 GPS Receiver
362 Dock Interface
364 Dock Recharger
400 Receive Image
405 Analyze Image
410 Provide Possible Locations
415 Final Location Test
420 Determine Next Location
430 Provide Guidance
440 Create Photo Product
500 Receive Image Set
505 Evaluate Image Set
510 Retrieve Prestored Content
520 Produce Photo Product
610 User Interface Display Screen
612 Initial Guidance Portion
614 First User Captured Picture
616 Next Location Message Area
620 User Interface Display Screen
622 Initial Guidance Portion
624 Second User Captured Picture
626 Next Location Message Area
700 First Photo Product
710 First Prestored Image Content Specific Page Title
712 Second Prestored Image Content Specific Page Title
702 Second Photo Product
720 First User Image
722 Second User Image
730 First Image Content Specific Coupon
732 Second Image Content Specific Coupon
800 First Page
802A User Captured Image
804A Image
804B Image
806A Image
806B Image 810 Graphic Drawing
812 Panoramic Image
814 Graphic Drawing
820 Text Message
822 Text
824 Text
830 Second Page
832 Prestored Text Information
834 Prestored Image
840 Third Page
842 Prestored Graphic
844 Prestored Text Information
846 Machine Readable Code
848 Human Readable URL
850 First Page
852A Captured Image
852B Captured Image
852C Captured Image
854 Text
856 Title
858 Prestored Graphics Information
860 Last Page
862 Advertisement
864 Photo Book
868 Photo Mug
870 Second Page
872A Object
872B Object
874A Captured Image
874B Captured Image
876 Prestored Advertising Information
880 Third Page
882 First Coupon
884 Second Coupon
886 Third Coupon

The invention claimed is:

1. An image capture device comprising:
an image sensor configured to capture a digital image of a scene;
an image display; and
a data processing system configured to:
display, on the image display, guidance information for capturing a first digital image at a location of a first scene;
capture, via the image sensor, the first digital image of the first scene using the guidance information;
analyze pixel data of the first digital image to determine a location of a second scene and guidance information for locating the second scene, wherein the location of the second scene is selected from a plurality of possible locations, and wherein the location of the second scene is different from the location of the first scene; and
display, on the image display, the guidance information for locating the second scene.

2. The image capture device of claim 1, wherein the data processing system is further configured to provide guidance concerning a location of a third scene different from the first and second scenes responsive to an input rejecting the location of the second scene.

3. The image capture device of claim 1, further comprising a wireless interface configured to transmit the first digital image to a service provider.

4. The image capture device of claim 1, wherein the data processing system is further configured to analyze the pixel data of the first digital image to determine how many people are depicted in the first digital image.

5. The image capture device of claim 1, wherein the data processing system is further configured to analyze the pixel data of the first digital image to determine an approximate age of a person depicted in the first digital image.

6. The image capture device of claim 1, further comprising a wireless interface configured to receive ambient condition information, wherein the data processing system is further configured to determine the location of the second scene based on the ambient condition information.

7. The image capture device of claim 6, wherein the ambient condition information includes weather information.

8. The image capture device of claim 6, wherein the ambient condition information includes geolocation information.

9. The image capture device of claim 6, wherein the ambient condition information includes time of day information.

10. The image capture device of claim 1, wherein the data processing system is further configured to analyze the pixel data of the first digital image to determine a landmark depicted in the first digital image.

11. The image capture device of claim 1, wherein the data processing system is further configured to cause the image sensor to capture a second digital image of the second scene based on the second image guidance information.

12. A method comprising:
displaying, on an image display of a computing device, guidance information for capturing a first digital image at a location of a first scene;
capturing, by the computing device, the first digital image of the first scene using the guidance information;
analyzing, by the computing device, pixel data of the first digital image to determine a location of a second scene and guidance information for locating the second scene, wherein the location of the second scene is selected from a plurality of possible locations, and wherein the location of the second scene is different from the location of the first scene; and
displaying, by the computing device, the guidance information for locating the second scene.

13. The method of claim 12, further comprising providing guidance concerning a location of a third scene different from the first and second scenes responsive to an input rejecting the location of the second scene.

14. The method of claim 12, wherein the analyzing the pixel data of the first digital image comprises analyzing the pixel data of the first digital image to determine how many people are depicted in the first digital image.

15. The method of claim 12, wherein the analyzing the pixel data of the first digital image comprises analyzing the pixel data of the first digital image to determine an approximate age of a person depicted in the first digital image.

16. The method of claim 12, further comprising receiving ambient condition information; and determining the location of the second scene based on the ambient condition information.

17. The method of claim 16, wherein the ambient condition information comprises at least one of weather information at the location of the second scene, geolocation information of the first scene or second scene, or time of day information.

18. The method of claim 12, wherein the analyzing the pixel data of the first digital image comprises analyzing the pixel data of the first digital image to determine a landmark depicted in the first digital image.

19. The method of claim 12, further comprising capturing a second digital image of the second scene based on the second image guidance information.

20. A non-transitory computer-readable medium having instructions stored thereon that, upon execution by a computing device, cause the computing device to perform operations comprising:
- displaying guidance information for capturing a first digital image at a location of a first scene;
- capturing the first digital image of the first scene using the guidance information;
- analyzing pixel data of the first digital image to determine a location of a second scene and guidance information for locating the second scene, wherein the location of the second scene is selected from a plurality of possible locations, and wherein the location of the second scene is different from the location of the first scene; and displaying the guidance information for locating the second scene.

* * * * *